(12) United States Patent
De Munck et al.

(10) Patent No.: US 10,086,348 B2
(45) Date of Patent: Oct. 2, 2018

(54) APPARATUSES INCLUDING SUPPORT MEMBER MODIFICATIONS AND PROCESSES RELATED THERETO

(75) Inventors: Nicolaas A. De Munck, Barendrecht (NL); Geoffrey Evans, Southampton (GB); Friso Schmalz, Hellevoetsluis (NL)

(73) Assignee: ExxonMobil Chemical Patents Inc., Baytown, TX (US)

( * ) Notice: Subject to any disclaimer, the term of this patent is extended or adjusted under 35 U.S.C. 154(b) by 844 days.

(21) Appl. No.: 13/996,465

(22) PCT Filed: Dec. 16, 2011

(86) PCT No.: PCT/US2011/065327
§ 371 (c)(1),
(2), (4) Date: Jul. 10, 2013

(87) PCT Pub. No.: WO2012/099665
PCT Pub. Date: Jul. 26, 2012

(65) Prior Publication Data
US 2013/0289285 A1    Oct. 31, 2013

Related U.S. Application Data

(60) Provisional application No. 61/435,015, filed on Jan. 21, 2011.

(30) Foreign Application Priority Data

Jun. 20, 2011  (EP) .................................... 11170604

(51) Int. Cl.
*F28F 9/00* (2006.01)
*B01J 8/00* (2006.01)
*B01D 5/00* (2006.01)

(52) U.S. Cl.
CPC ............ *B01J 8/008* (2013.01); *B01D 5/0006* (2013.01); *B01D 5/0009* (2013.01); *B01J 2219/00081* (2013.01); *B01J 2219/00083* (2013.01)

(58) Field of Classification Search
CPC .......... B01D 5/0006; B01J 2219/00081; B01J 2219/00083; B01J 8/008; B01J 5/0009;
(Continued)

(56) References Cited

U.S. PATENT DOCUMENTS 2,355,800 A * 8/1944 Hensel .................. C10G 9/20
122/510
2,963,276 A * 12/1960 Nelson .................. F24D 19/04
165/134.1
(Continued)

FOREIGN PATENT DOCUMENTS

DE        1 072 965       1/1960
DE       195 12 845       7/1996
(Continued)

*Primary Examiner* — Jason Thompson
(74) *Attorney, Agent, or Firm* — Darryl M. Tyus

(57) ABSTRACT

Embodiments of an invention disclosed herein relate to apparatuses and processes related thereto including modifications of support members that significantly reduce the magnitude of stress at junctions between the support members and the shell walls of the apparatuses.

12 Claims, 7 Drawing Sheets

(58) Field of Classification Search
CPC ........ F28F 9/013; F28F 9/0131; F28F 9/0132;
F28D 7/16; F28D 7/1607; F28D 7/163
USPC .................................. 165/67, 162, 163, 178
See application file for complete search history.

(56) References Cited

U.S. PATENT DOCUMENTS

| | | | | |
|---|---|---|---|---|
| 3,259,112 A | * | 7/1966 | Lee | F22B 37/205 |
| | | | | 122/510 |
| 3,339,630 A | * | 9/1967 | Schlentner | F24D 19/04 |
| | | | | 165/55 |
| 3,530,835 A | * | 9/1970 | Wiesenthal | F22B 37/36 |
| | | | | 122/494 |
| 3,599,914 A | * | 8/1971 | Stephens | F27D 1/0036 |
| | | | | 122/510 |
| 3,844,515 A | * | 10/1974 | Knol | F22B 37/20 |
| | | | | 122/510 |
| 4,262,741 A | * | 4/1981 | Rothenbucher | F28F 9/013 |
| | | | | 165/162 |
| 4,330,030 A | * | 5/1982 | Cate | F28D 7/08 |
| | | | | 165/149 |
| 4,435,580 A | | 3/1984 | Miserlis | |
| 5,214,157 A | | 5/1993 | Healy et al. | |
| 5,508,443 A | | 4/1996 | Dengler | |
| 5,869,700 A | | 2/1999 | Jones et al. | |
| 2003/0066631 A1 | * | 4/2003 | Jayaweera | F28F 19/06 |
| | | | | 165/133 |
| 2003/0145979 A1 | * | 8/2003 | Beddome | F28D 9/0043 |
| | | | | 165/81 |

FOREIGN PATENT DOCUMENTS

| | | |
|---|---|---|
| DE | 195 46 702 | 4/1997 |
| EP | 0 045 392 | 6/1983 |
| GB | 1212088 | 11/1970 |
| WO | WO 2009/040245 | 4/2009 |
| WO | WO 2009/040246 | 4/2009 |
| WO | WO 2011/100081 | 8/2011 |

* cited by examiner

APPARATUSES INCLUDING SUPPORT MEMBER MODIFICATIONS AND PROCESSES RELATED THERETO

CROSS-REFERENCE TO RELATED APPLICATIONS

This application is a 371 National Stage Application of International Application No. PCT/US2011/065327, filed Dec. 16, 2011, which claims priority to EP Application No. 11170604.0, filed Jun. 20, 2011, and claims the benefit of Ser. No. 61/435,015, filed Jan. 21, 2011, the disclosures of which are hereby incorporated by reference in their entireties.

BACKGROUND

Phthalic anhydride (PAN) is an important commercial chemical useful in the manufacture of plasticizers, polyesters, alkyd resins, and dyes. One important use is in the production of alkyl phthalates such as di-isononyl or di-isodecyl phthalates which are used as plasticizers typically for polyvinyl chloride. These phthalates may be further hydrogenated to the corresponding di-cyclohexanoates. Phthalic anhydride is typically produced from raw materials such as ortho-xylene (o-xylene) and naphthalene, suitable oxidation processes are disclosed in WO 2009/040245 and WO 2009/040246. The price of these raw materials and, as a direct result, the price of phthalic anhydride, has fluctuated greatly depending upon supply and demand. Because the cost of the raw materials is a major factor in the price of phthalic anhydride, it is of great importance that any system used to produce phthalic anhydride capture as much of the resultant product as possible. Phthalic anhydride may be successfully produced from any of a number of processes, i.e., (1) air oxidation of o-xylene in fixed-bed reactors, (2) air oxidation of petroleum or coal tar naphthalene in fixed-bed reactors, (3) fluid bed oxidation of o-xylene, (4) fluid bed oxidation of petroleum or coal tar naphthalene, and (5) liquid phase oxidation of o-xylene or naphthalene.

The general process scheme for the various vapor phase routes is to mix the hydrocarbon feed (in the vapor form) with compressed air and to feed the mixture to multi-tubular fixed-bed reactors which contain tubes packed with oxidation catalysts, e.g., vanadium oxide and titanium dioxide coated on an inert, nonporous carrier. When fluid bed reactors are used, the hydrocarbon feed in liquid form can be injected directly into the fluidized catalyst bed so that the air and the hydrocarbon are mixed in the reactor to produce a reactor effluent gas (i.e., the vapor phase oxidation product). The reactors are equipped with means for removing the heat of the oxidation reaction. The heat that is removed is used to generate steam.

After the vapor phase oxidation product exits either the fixed-bed or fluid bed reactors, it is cooled to cause the phthalic anhydride to condense. This allows separation of the phthalic anhydride from the gas stream.

In the production of phthalic anhydride, the reaction product exiting the multi-tubular fixed-bed or fluid-bed reactor containing the oxidation catalyst is a hot gas mixture containing among others nitrogen, water, $CO_2$, and the desired phthalic anhydride. The reaction product is typically first cooled in a gas cooler, whereby most conveniently steam may be generated on the coolant side. The phthalic anhydride is usually recovered from the cooled reaction product by (de)sublimation in a switch condenser, a phase change that also may be called condensation or deposition, whereby the phthalic anhydride is collected as a solid on the switch condenser surface, usually the heat exchanger tubes, which are typically finned on the gas side to improve the heat transfer. The switch condenser is cooled with a cooling fluid, typically a thermal fluid or hot oil, capable of withstanding the high temperatures that are employed. After having been in collecting service, building up a layer of solid phthalic anhydride, typically on the outer surface of the finned exchanger tubes, the switch condenser may be switched from collecting service to melting service. Hereby, the gas flow through the switch condenser is usually discontinued and typically the cooling fluid is replaced by a heating fluid, usually the same thermal fluid or hot oil but now after heating, such that the phthalic anhydride melts and forms a liquid, and the liquid phthalic anhydride is drained and collected for further processing. The emptied switch condenser is cooled before putting it back into collecting service by replacing the heating fluid by the cooling fluid.

The phthalic anhydride is typically condensed as a solid. However, a two-stage condensation system may be used to first condense a portion of the phthalic anhydride as a liquid and then to condense the remainder as a solid. The process further comprises recovering phthalic anhydride from the reaction product mixture by a precondenser condensing phthalic anhydride as a liquid followed by a switch condenser collecting phthalic anhydride as a solid. The addition of a precondenser provides the advantage that the gaseous mixture is brought outside the explosive limits by reducing the concentration of the explosive components and by lowering the operating temperature to below the minimum ignition temperature for the resulting gaseous mixture, and this before the gas mixture enters the switch condensers. The precondenser preferably also contains finned tubes, and may be cooled with any type of cooling medium, for example, hot water may be used as it allows avoiding the occurrence of spots having too low temperatures and having the ability to control the precondenser outlet temperature within a narrow range. The outlet of the precondenser may be kept at a temperature of at least 137° C.

Machinery and equipment that operate under severe and varying conditions are often susceptible to fatigue, especially at areas that are the focal points of stress. Fatigue can result in a premature failure, requiring either repair or replacement, for example, the failure of components through the application of cyclical stress, in particular at the junctions of two or more components. Switch condensers are commonly used in the recovery of phthalic anhydride from a reaction gas. (See, for example, U.S. Pat. Nos. 4,435,580, 5,214,157, 5,508,443, 5,869,700, and Ser. No. 61/304,063, filed Feb. 12, 2010, to De Munck et al.). They operate in a cyclical service that includes a temperature gradient of from 50° C. to 200° C. or alternatively, from 60° C. to 180° C. They are susceptible to fatigue, especially, at junctions, due to the temperature variations caused by the condensing/cooling mode and the heating/melting mode extending a broad and varying temperature gradient through-out the body of the condenser.

To achieve the temperature cycles, the switch condensers comprise heavy tubular bundles that circulate fluids in order to accomplish the heat exchange. The internal heat exchanger bundles are supported by support members, generally, rectangular beams, connecting and extending through the outer walls of the shell of the switch condenser. Junctions are formed, where the support members cross the shell wall, these are typically made by welding. Cracking or failure of the junctions may occur due to stress caused by the temperature gradient in the switch condenser at the coupling of the support members and shell wall, for example, at the upper and lower beams with the shell wall. Severe failures such as through wall cracks cause leakage of phthalic anhydride and damage the shell by acid corrosion.

Background references include DE 10 72 965, DE 195 12 845, DE 195 46 702, EP 0 045 392 A, and GB 1 212 088.

Thus, there exists a need for a design modification that significantly reduces the magnitude of the stress at the junctions between the support members and the shell wall that eliminates or significantly reduces failures such as cracking at these locations.

SUMMARY

In a class of embodiments, the invention provides for apparatus comprising: (a) a shell having an inner wall and an outer wall; (b) at least two support members, wherein the at least two support members extend through the inner wall and the outer wall of the shell; (c) a plurality of side supports proximal to the outer wall and coupled to the at least two support members; and (d) at least one stiffener coupling the inner wall and one or more of the at least two support members.

In another class of embodiments, the invention also provides for a process for operating an apparatus comprising subjecting the apparatus to a mechanical force, a frictional force, a gravitational force, a tension force, a compressive force, a normal force, a bending force, a magnetic force, an air resistance force, an applied force, a spring force, or any combination thereof; wherein the apparatus comprises: (a) a shell having an inner wall and an outer wall; (b) at least two support members, wherein the at least two support members extend through the inner wall and the outer wall of the shell; (c) a plurality of side supports proximal to the outer wall and coupled to the at least two support members; and (d) at least one stiffener coupling the inner wall and one or more of the at least two support members.

Other various embodiments are disclosed and claimed herein.

DETAILED DESCRIPTION

Before the present apparatuses, devices, softwares, hardwares, equipments, configurations, schematics, systems, and/or processes/methods are disclosed and described, it is to be understood that unless otherwise indicated this invention is not limited to specific apparatuses, devices, softwares, hardwares, equipments, configurations, schematics, systems, processes/methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Machinery and equipment (herein collectively "apparatus") that operate under severe and varying conditions are often susceptible to fatigue. Fatigue is highly likely at locations that are the focal points of stress, for example, stresses acting upon junctions or connections of two or more members of an apparatus. As used herein, "junction(s)" refers to the joining of members by welding, bolting, or any other method that typically forms a permanent or semi-permanent connection. Examples include without limitation welds, including full penetration and partial penetration butt welds, fillet welds (seam welds, circumferential welds, longitudinal welds, etc.) and bolted joints (bolted structural members). Junctions are susceptible to fatigue due to among other things temperature gradients. Thus, embodiments of the invention disclosed herein provide for modifications that significantly reduce or transfer the magnitude of the stress at the junctions of the switch condenser between the support members and the shell wall. In turn, such mitigation of these stresses eliminates or significantly reduces fatigue failures such as cracking at these locations.

In a class of embodiments, the invention provides for an apparatus comprising: (a) a shell; (b) a plurality of support members; (c) a plurality of side supports; and (d) a plurality of stiffeners coupled with the plurality of support members; wherein one or more of the stiffeners are located in the shell.

Figure 1:
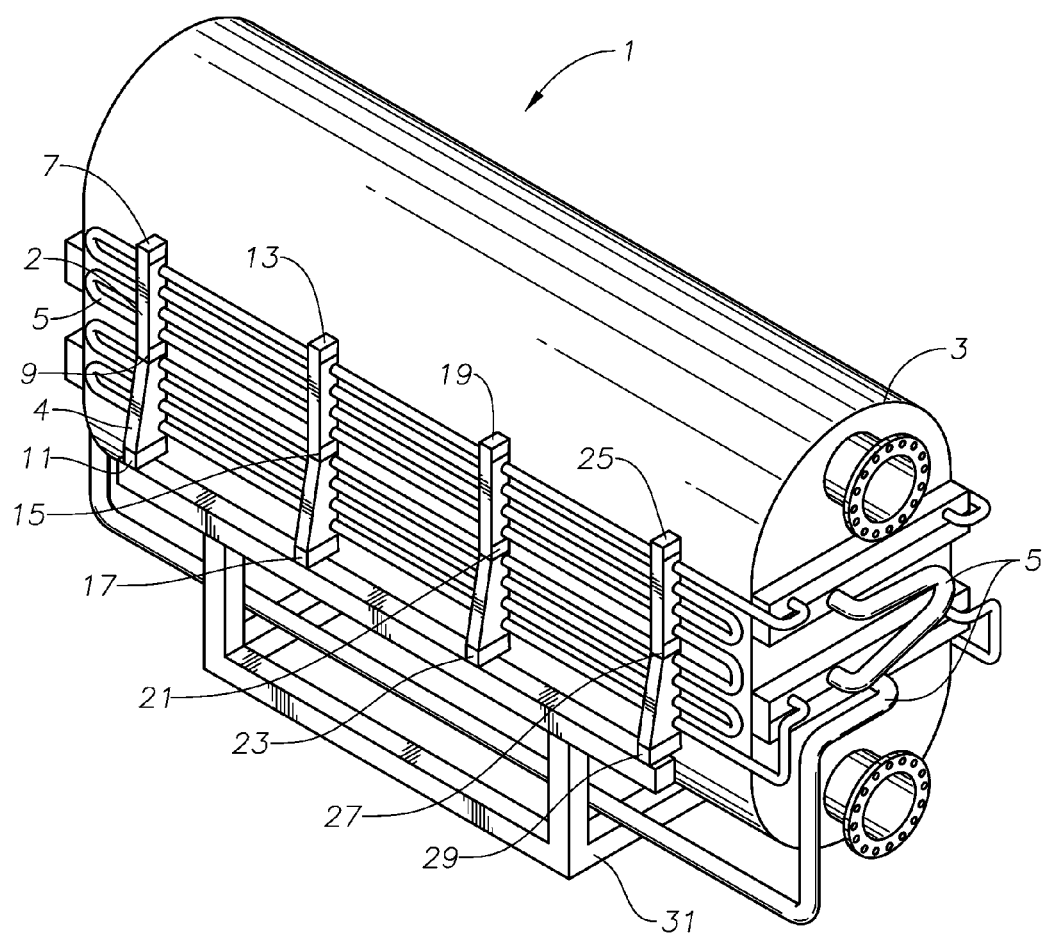
FIG. 1 is a representation of an apparatus according to several embodiments of the invention.
Figure 2:
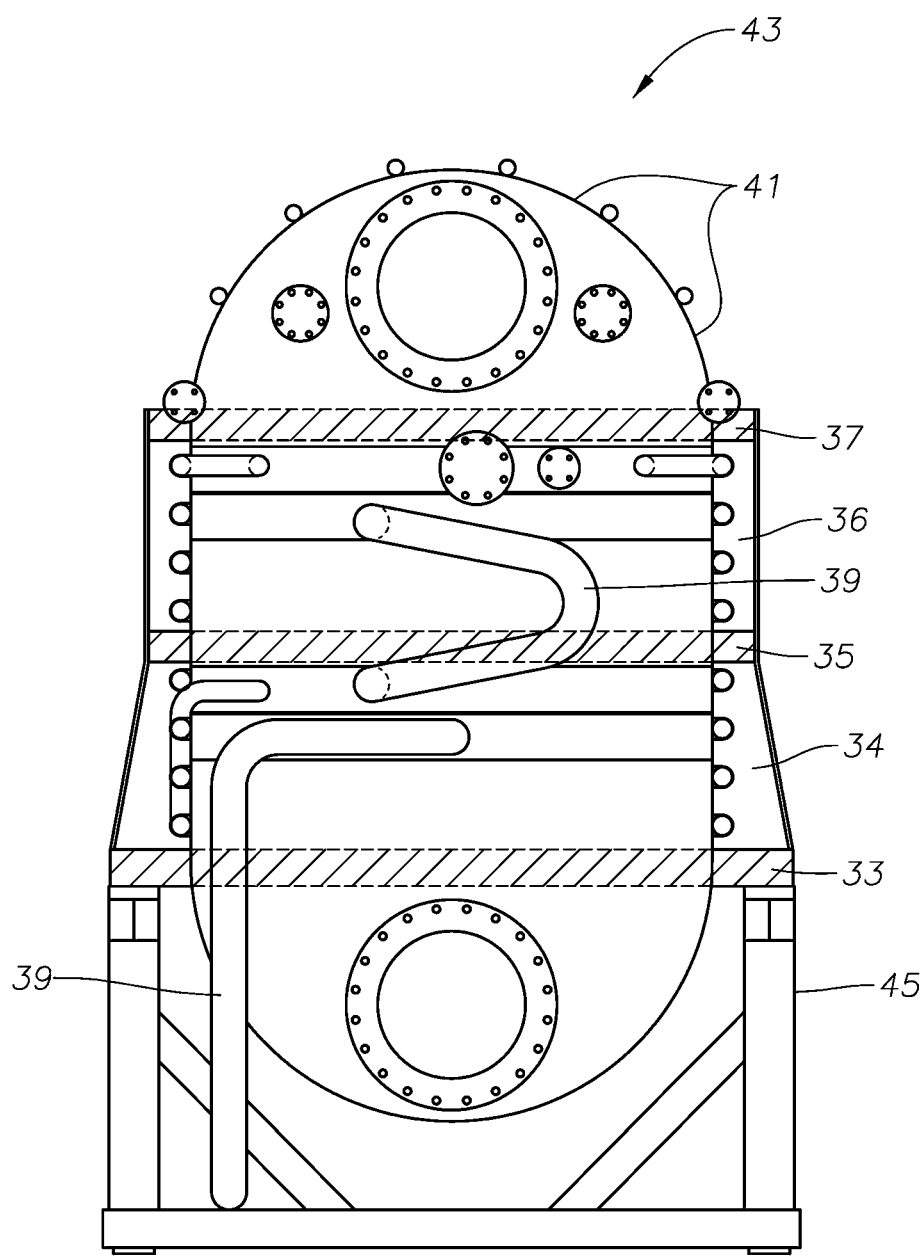
FIG. 2 is a representation of an end view of an apparatus according to several embodiments of the invention.

An example of such an apparatus may be found in FIG. 1: a switch condenser 1. In FIG. 1, the shell 3 is supported by a base 31 and at least a portion of tubular bundles 5 running alongside the outer surfaces of the shell 49 and at least a portion of heat exchange fluid piping 5 run inside and through the shell. The tubular bundles and heat exchange fluid piping are supported by a plurality of support members 7-29. The support members 7-29 are supported by a plurality of side supports 2 and 4. With reference to FIG. 2 that provides an end view of such an apparatus, tubular bundles 39 having at least a portion of running alongside the outer surface of the shell and heat exchange fluid piping 39 may be viewed as having at least a portion inside the shell 41 that is supported by a base 45 of a switch condenser 43. The tubular bundles and heat exchange fluid piping is also supported by upper support members 37, middle support members 35, and lower support members 33. The upper support members 37 are supported by upper side supports 36, and the middle support members 35 are supported by lower side supports 34.

As used herein, "stiffener" refers to one or more appendages or integrated pieces that are able to transfer or otherwise mitigate at least partially the stress from at least one member to one or more other members of an apparatus. In an embodiment, the stiffener comprises at least one doubler plate and at least one internal rib, and optionally, further comprising at least one internal rib support member.

In some embodiments, the apparatus may further comprise at least one of (e) a base, and (f) a plurality of tubular bundles.

Figure 3:
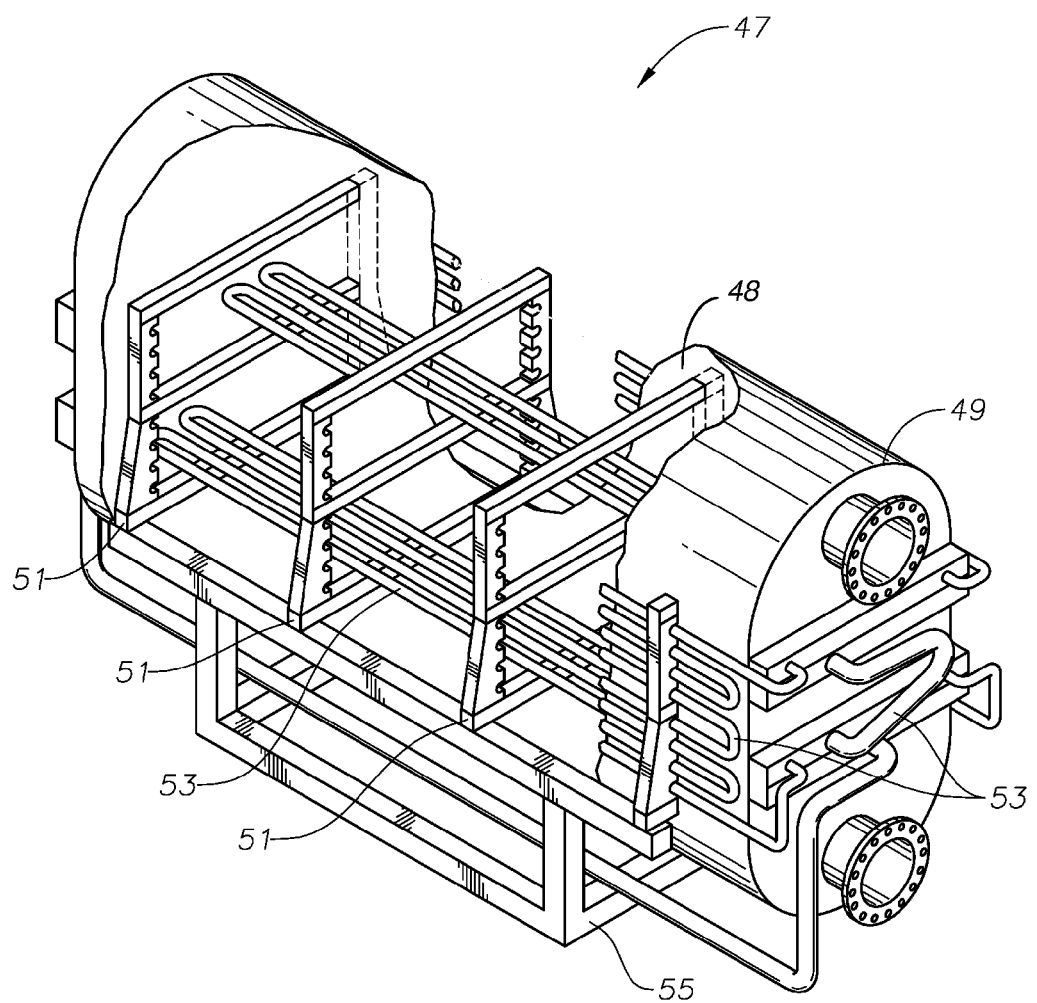
FIG. 3 is a representation of a cutaway view of an apparatus according to several embodiments of the invention.

With reference to the support members, the plurality of support members may comprise lower support members (FIG. 1: 11, 17, 23, 29), middle support members (FIG. 1: 9, 15, 21, 27), and upper support members (FIG. 1: 7, 13, 19, 25). The plurality of support members may also comprise outer support members (FIG. 1: 7, 9, 11, 25, 27, 29) and inner support members (FIG. 1: 13, 15, 17, 19, 21, 23). In several classes of embodiments, the plurality of support members may be two, three, four or more and may be placed equidistant with relation to each other along the vertical axis of the apparatus. In other embodiments, they may be placed at different distances from each other along the vertical axis of the apparatus. The plurality of support members may also be two, three, four, five or more and may also be placed equidistant with relation to each other along the horizontal axis of the apparatus. In other embodiments, they may be placed at different distances from each other along the horizontal axis of the apparatus. Typically, support members may extend beyond the width of the shell and cross through the first inner shell surface and the first outer shell surface on a portion of the shell and a second shell inner surface and second shell outer surface on another portion of the shell along an axis of the shell as exemplified in the cutaway view shown in FIG. 3. In particular, a plurality of support members 51 are shown crossing and running through the first inner surface of the shell 48 and first outer surface of the shell 49 along a horizontal axis of the apparatus 47 that is supported by the base 55. The support members are provided to support the tubular bundles 53 having at least a portion of running alongside the outer surface of the shell and heat exchange fluid piping 53 running alongside and through the apparatus.

The support members can be square, rectangular, circular, oval or any other shape and can be hollow, massive or anything in between.

With reference to the stiffeners, in several classes of embodiments, stiffeners may also be coupled with the shell of the apparatus. Stiffeners may comprise an internal rib and a doubler plate. In several embodiments, the internal rib and doubler plate are integrated into one piece at a 90° angle. In a class of embodiments, the stiffener may further comprise an internal rib support member coupled to the internal rib and at least one support member.

Figure 6:
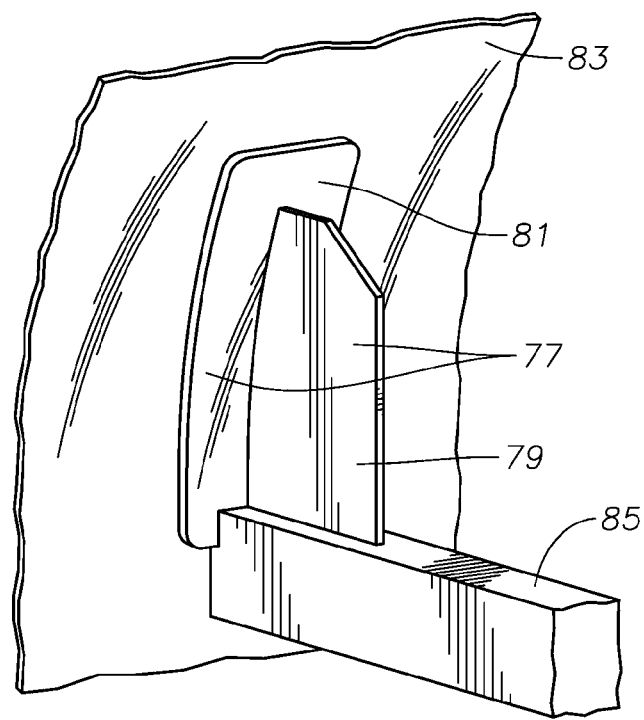
FIG. 6 is a representation of an enlarged view of a stiffener of an apparatus according to several embodiments of the invention.
Figure 7:
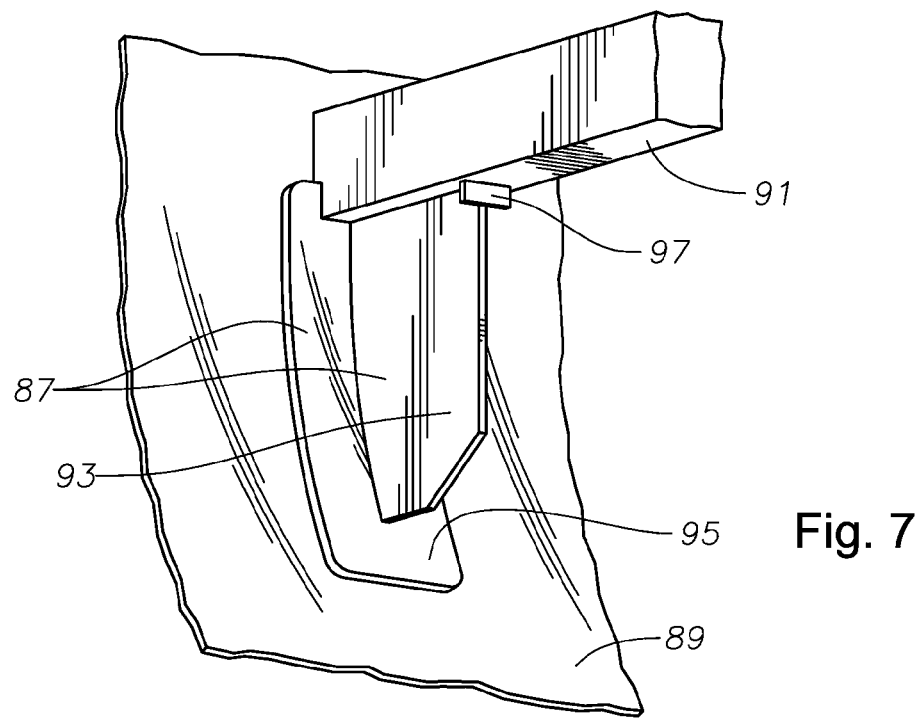
FIG. 7 is a representation of another enlarged view of a stiffener according to several embodiments of the invention.

For example, FIG. 6 shows a stiffener 77 (located internally in the shell of an apparatus) comprising an internal rib 79 coupled with a doubler plate 81. The stiffener is coupled with the shell wall 83 and its corresponding support member 85. FIG. 7 is similar in that it shows a stiffener 87 (located internally in the shell of the apparatus) coupled with the shell wall 89 and its corresponding support member 91. However, in addition to the stiffener comprising an internal rib 93 and doubler plate 95, the stiffener also comprises an internal rib support member 97 coupled with the internal rib and the corresponding support member 91.

Figure 8:
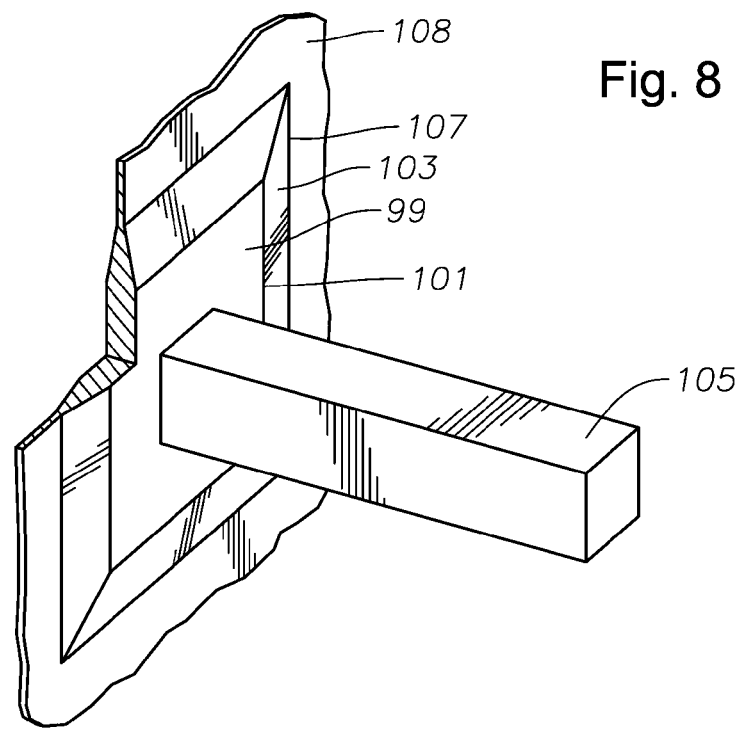
FIG. 8 is a representation of enlarged view of an insert plate according to several embodiments of the invention.
Figure 9:
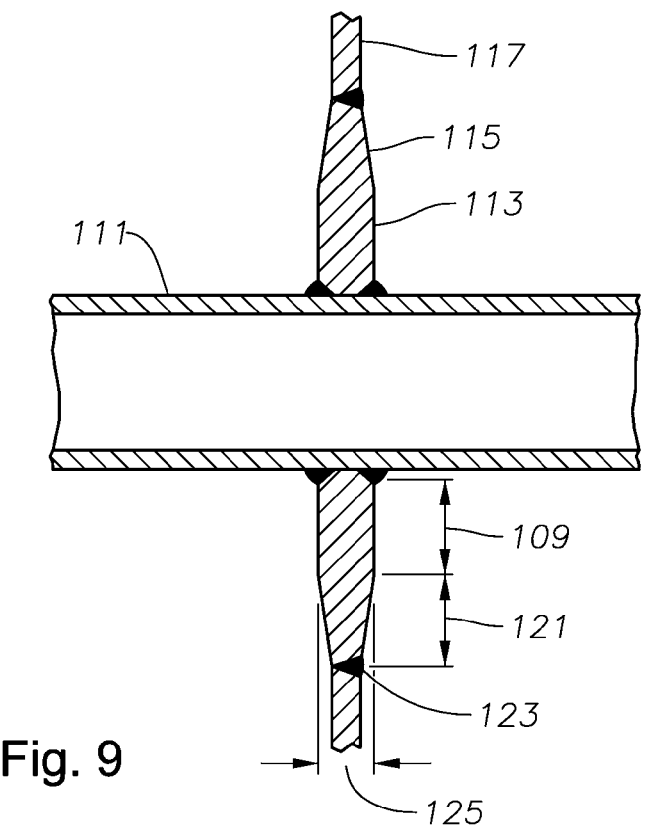
FIG. 9 is a cross-sectional view of an insert plate according to several embodiments of the invention.

In another embodiment where insufficient space is available for a stiffener based on an internal rib and a doubler plate as shown above, it is convenient to use an insert plate in the shell around the support member which may also be referred to herein as a stiffener. For example, FIG. 8 shows a support member 105 crossing an insert plate 99, which at its edges 101 and smoothly transitions from a thick plate to a thin plate through a taper 103. The taper 103 is connected by a weld 107 to the shell plate 108. FIG. 9 is a cross-sectional view of a support member 111 passing through an insert plate 113, which tapers at 115 to shell 117. 109, 121, 123, and 125 show the relative dimensions of the components according to an embodiment of the invention as discussed in more detail below. The insert plate and the taper can be square, rectangular, circular, oval or any other shape and can be hollow, massive or anything in between.

In any of the aforementioned embodiments, the junctions may be made permanent, optionally, by welding. The welds may be "dressed" to improve fatigue resistance or left undressed. A dressed weld is one which is ground to improve its profile and remove any stress raisers or notches.

In any of the aforementioned embodiments, the apparatus is a switch condenser.

In any of the aforementioned embodiments, any one or all of (a)-(f) may comprise a Group 3-13 metal, carbon, or any combination thereof.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form denoted with Roman numerals (also appearing in the same), or unless otherwise noted.

In any of the aforementioned embodiments, any one or all of (a)-(f) may comprise iron, carbon, aluminum, titanium, and any combination thereof.

In the embodiment above, the combination may be in the form of steel (to include but not limited to carbon steel, low alloy steel, duplex stainless steel, austenitic stainless steel, and any combination thereof).

The invention also provides for several classes of embodiments directed to a process for operating the apparatus and subjecting it to a mechanical force, a frictional force, a gravitational force, a tension force, a compressive force, a normal force, a bending force, a magnetic force, an air resistance force, an applied force, a spring force, or any combination thereof; wherein the apparatus comprises: (a) a shell; (b) a plurality of support members; (c) a plurality of side supports; and (d) a plurality of stiffeners coupled with the plurality of support members; wherein one or more of the stiffeners are located at a shell junction. The apparatus may further comprise at least one of (e) a base and (f) a plurality of tubular bundles.

In several of these embodiments, the force may stress the junction of at least one support member and the shell wall. The stiffener is configured to reduce the stress at the junction.

In a particular embodiment, the process may proceed in a continuous or semi-continuous manner. As used herein, "semi-continuous" manner refers to a continuous operation that provides for temporary periods of inoperability to conduct routine maintenance and inspection. In an embodiment, the process may proceed in a continuous or semi-continuous manner for 2 or more years without the need to repair any of the junctions of the support members and the shell wall that fail due to the stress as compared to the same or similar process that operates an apparatus without one or more stiffeners. In another embodiment, the process may proceed in a continuous or semi-continuous manner for 5 or more years without the need to repair any of the junctions of the support members and the shell wall that fail due to the stress as compared to the same or similar process that operates an apparatus without one or more stiffeners.

In any of the embodiments described herein, the installation of the stiffener may facilitate the reduction of the magnitude of stress by a factor of up to 4 times when compared to a junction with the stiffener omitted or absent.

Figure 4:
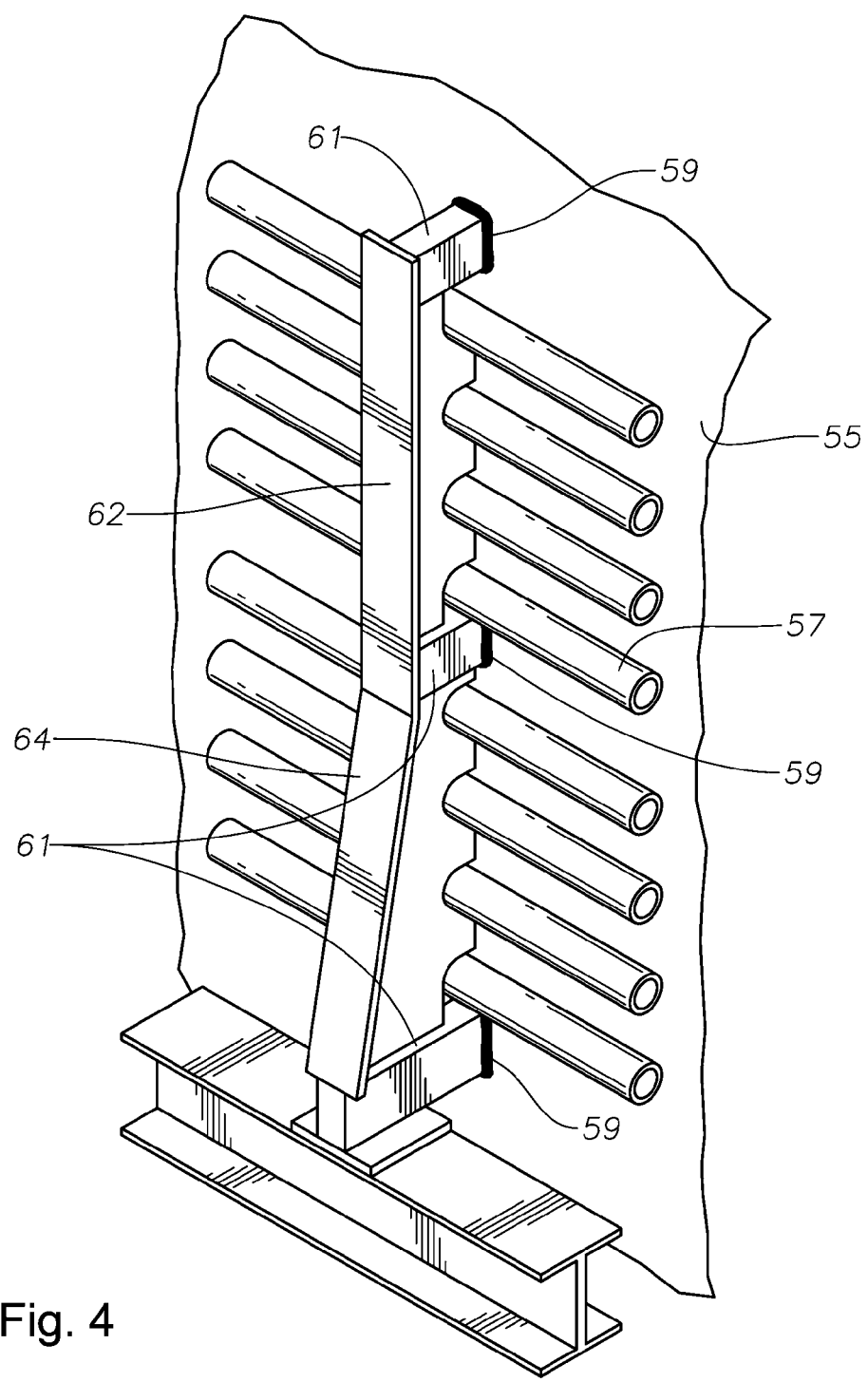
FIG. 4 is a representation of an enlarged view of a portion of an apparatus according to several embodiments of the invention.
Figure 5:
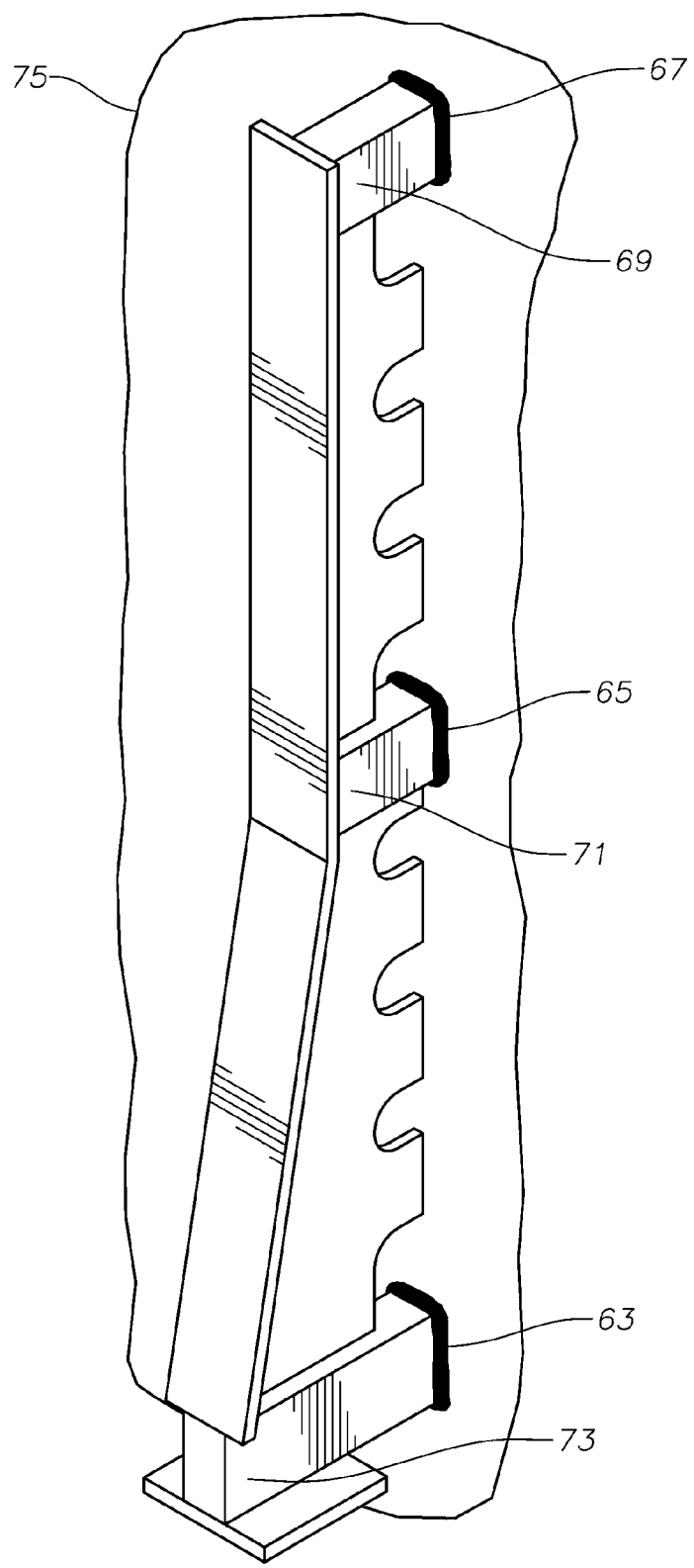
FIG. 5 is a representation of another enlarged view of a portion of an apparatus according to several embodiments of the invention.

For example, with reference to FIG. 4 that shows an enlarged view of a portion of an apparatus, a plurality of support members 61 cross through the shell wall 55 of the apparatus via a junction 59 (e.g., a weld). Additionally, shown in FIG. 4 are side supports 62 and 64. The support members and side supports provide support to the tubular bundles 57. As shown in FIG. 5, an upper support member 69, a middle support member 71, and a lower support member 73 cross the shell wall 75 of an apparatus via junctions 63, 65, 67 respectively (e.g., welds). Side supports may be viewed but are not labeled.

In a class of embodiments, the process may further comprise recovering an anhydride, optionally or preferably, phthalic anhydride or maleic anhydride, through the operation of one or more switch condensers.

Generally, the effect of utilizing a stiffener in a manner described above may reduce the stress at the junction of the corresponding support member and shell wall from a magnitude where fatigue will be expected to a magnitude were fatigue will not be expected over the period of continuous or semi continuous operation.

The operation and recovery of the anhydride using switch condensers is generally described in, for example, U.S. Pat. Nos. 4,435,580, 5,214,157, 5,508,443, 5,869,700, and Ser. No. 61/304,063, filed Feb. 12, 2010, to De Munck et al.).

In some embodiments directed to the use of switch condensers, the high stresses at the upper and lower support member junctions may be mitigated by the incorporation of a stiffener coupled with its corresponding support member and the apparatus shell wall. The stiffener may comprise an internal rib and doubler plate fitted to the upper and lower beams and may be coupled to the internal wall of the switch condenser. In a specific embodiment, the stiffener may comprise a carbon steel backing or doubler plate (with a thickness of preferably 20%-150%, more preferably 30%-125%, even more preferably 40%-100%, and most preferably 50%-75% of the shell wall thickness), optionally in combination with an internal rib (with a thickness of preferably 40%-200%, more preferably 60%-150%, even more preferably 80%-150%, and most preferably 100%-125% of the shell wall thickness). In some embodiments, it is important that all corners have a good radius.

Generally, the middle support members of an apparatus are not easily accessible and the high stresses at the junctions of the middle support members with the shell may be only mitigated by applying either an insert plate or doubler plate. The insert plate may comprise a taper and may be coupled to the shell wall. The insert plate may be 200%-300% of the height and width of the support beams crossing the shell wall with a thickness of 150%-200% of the thickness of the shell wall. In a class of embodiments, it is our preference that the length of the taper is 3 times the difference in wall thickness between the insert and the shell wall. If a doubler plate is used instead of an insert plate, the dimensions will follow the requirements for the insert plate. In an embodiment, the doubler plate will be attached by welding and the welds dressed smooth. In some embodiments it is important that all corners have a good radius.

For these embodiments, the effect of utilizing a stiffener reduces the predicted stress at the junction of the corresponding support member and shell wall by a factor of up to 4. Stress reduction by a factor of 4 may increase the fatigue life by a factor of 50. Alternatively stated, this reduction in stress at the junction may mean an increase in fatigue life for the junction of an apparatus, for example, a switch condenser, from 20,000 cycles to $10^6$ cycles. Fatigue life refers to the cumulative number of stress cycles the apparatus is exposed to before the initiation of a crack occurs. Definitive fatigue life estimates are difficult to precisely predict due to a number of variables such as actual weld condition, geometry, stress concentration, and stress range depending upon the mode of operation.

However, fatigue life estimates may be approximated by the use of S—N curves (Stress—Number of Cycles). Various publications, national and international standards are available that detail S-N curves for various materials and the methodology for the application of the curves. Exemplary references include: British Standards BS 7068-1993: Fatigue design and assessment of steel structures; British Standards PD5500-2009: Specification for unfired fusion welded pressure vessels; and British Standards EN13445-3 2009: Unfired Pressure Vessels—Design ASME VIII—Division 2-2007: Alternative Rules for Pressure Vessels Analysis and Representation of Fatigue Data: Joseph B. Conway and Lars H. Sjodahl.

In other embodiments, the apparatuses and processes disclosed herein also have relevancy to members, component elements, shell walls, junctions of reactors, such as reactors that undergo cryogenic cycles, for example, butyl rubber polymerization reactors, and other reaction systems that run at extreme operating conditions. In another embodiment, the apparatuses and processes disclosed herein also have relevancy to separation equipment in cyclical service, such as pressure swing absorbers, and to batch processes subject to thermal and pressure cycles, such as for example reactors, heat exchangers, separation equipment, and any combination thereof.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

A number of mechanical failures occurred at the junction of the upper and lower support beams with the shell wall of an apparatus. A hypothesis was developed that the cracking was due to high cyclical stress caused by the heating and cooling of the apparatus resulting in fatigue. The hypothesis was tested by the use of Finite Element Analysis (FEA). Design by analysis techniques have been used to determine the approximate magnitude of stress at the support beam junction with the shell using Finite Element Analysis (FEA). Commercially available software, ALGOR (www.algor.com), has been used to model the apparatus, in this example, a switch condenser. The analysis uses a linear elastic material model to carry out a static stress analysis using "Plate" elements that were 3 or 4 noded elements formulated in 3-dimensional space. The elements support the use of pressure across the face and the application of temperature. Isotropic material properties have been used for carbon steel, equivalent to ASTM A36. To reduce processing time, the model represented a quarter of the switch condenser, with symmetry boundary conditions on the two vertical planes. Vertical displacement of the model was prevented by the use of elastic boundary elements at the point of contact to the support frame. The switch condenser support frame was analyzed separately to determine vertical stiffness at the support points; these values have been used to set the boundary element stiffness. The plate elements were grouped into parts of differing thickness to represent the thickness of the components of the switch condenser. To simplify the modeling of the outer oil tubes, ribs used which had an equivalent section modulus/stiffness to the oil tubes.

A FEA model was developed that represents the apparatus, in particular the stiffness of the shell wall, end plate, external oil tubes, and internal supports. The stiffness of the supporting framework was represented by elastic boundary elements. The simulation model was a quarter symmetry model that represented one quarter of the apparatus with symmetry conditions around each of the two symmetry planes.

Temperatures were simulated in the FEA model to approximate the thermal gradient through the apparatus for the different modes of operation and the resulting stress at the location of the unexplained failures were evaluated. The temperature of the gas during the condensing entering the apparatus was 140° C., which gave an equal temperature of 140° C. to the section above the upper tube bundle. The temperature transitions from 140° C. to 90° C.-100° C. in the upper tube bundles, which was followed by further cooldown to 60° C. in the lower tube bundles, and 60° C. in the section below the lower tube bundles. The temperature simulations predict the relative thermal expansion of the apparatus and indicate the magnitude of the stress which was a function of the stiffness of the various components that make up the apparatus. The apparatus has been displaced by +2-+4 mm in the section above the upper tube bundle, 0-+1 mm in the upper tube bundles, 0--0.1 mm in the lower tube bundles, and -0.1--2 mm in the section below the lower tube bundles. By the thermal displacement, stresses were developed at the welded connections of the upper and lower support members. These stresses were in the order of 200-300 MPa. At the points of interest, i.e., the junction, it was evident that a cyclic stress range exists in which the life of the junctions was limited by fatigue.

Example 2

While the switch condenser geometry could be accurately modeled, the driving force for the cracks was unclear. The assessment took the form of a sensitivity assessment to determine critical parameters as the exact temperature distribution through the condenser could not be accurately represented. However, the following was ascertained. Analysis of internal pressure indicated no sensitivity at the shell wall/support beam junctions. Analysis of the expected temperature gradient through the height of the condenser indicated stress of sufficient magnitude at the shell wall to support beam junctions to cause fatigue over a limited number of cycles. The temperature gradients were an approximation based on process operating temperatures and assume a uniform temperature distribution from the top to the bottom of the switch condenser. The estimated stress suggested a finite fatigue life of approximately 20,000 cycles at the junction using the principles of PD 5500, Annex C. Thus, the sensitivity assessment indicated that the temperature gradients through heating and cooling were sufficient to drive fatigue failure. To verify the assumptions made in the assessment, the switch condenser was subjected to direct measurement of strain at the locations of interest, i.e., the junctions.

The measured temperatures were for the upper beams 67-74° C. in the cooling mode, 135° C. during the condensing mode, and 151-158° C. during the melting mode. The measured temperatures were for the lower beams 58° C. in the cooling and condensing mode, and 157-158° C. during the melting mode.

To verify the FEA, strain measurement was undertaken by the application of strain gauges to the apparatus at the points of interest. A commercial strain gauging company was employed to fit, monitor and record magnitudes of strain. VISHAY tee strain gauge rosettes (LWK-06-w250D-350) were fitted close to the wall/support beam junctions and the strain recorded over several operating cycles. The rosettes could not be placed directly on the points of maximum stress due to the configuration of the junction and fillet welds, however, they were placed as close to the junction as possible. Strain values were corrected by a factor of 1.35, based on the relative position of the strain gauge to the position of maximum stress as highlighted from the FEA model. The resulting strain measurements confirm a cyclic strain of sufficient magnitude to cause fatigue. The measurements confirm that the fatigue life was finite. Estimated life from the strain gauge results was of the order of 10,000 cycles. For the outer support beams, the maximum measured strain compressions were −128--462 µm/m for the upper support beams and −268 µm/m for the lower support beams. For the inner support beams, these values were −114--1166 µm/m and −325--958 µm/m.

For the outer support beams, the maximum measured strain tensions were 379-573 µm/m for the upper support beams and 513 µm/m for the lower support beams. For the inner support beams, these values were 99-503 µm/m and 424-465 µm/m.

Strain gauge rosettes were fitted to the shell wall close to the "at risk" junctions and measurements taken over several operational cycles. Stress was related to strain through the material Modulus of Elasticity; the strain values obtained during the period of measurement, when converted to stress indicated a cyclic stress range consistent with a limited fatigue life.

The differential between the sensitivity assessment and strain gauges was relatively small, based on the logarithmic scale of the S—N fatigue curves, the differential in the magnitude of the stress was about 50 MPa, around a 20% differential.

Example 3

The sensitivity analysis was verified by the strain gauge measurements with the predicted stresses being the right order of magnitude to usefully assess the implication of modifications. The model was developed further to test the reduction in stress at the junction by the addition of a stiffener. The location of the maximum stress was moved to the edge of the doubler plate on the curvature of the shell. The estimated number of fatigue cycles at this position was of the order of $10^6$ cycles. The reduced stress has extended the fatigue life by a factor of 50.

The quarter symmetry FEA model was used to test the effect of potential modifications to the apparatus. Changes to the stiffness of the shell by the addition of a stiffener were evaluated using the model to test the relative change in the cyclic stress. The stress at the beam to wall junction was reduced to 50 MPa, whereas the maximum stress at the end of the internal doubler plate was of the order of 100 MPa. For the geometry of the apparatus, an optimized stiffener was designed consisting of a "doubler plate" fitted to the shell and a "rib" or "gusset" fitted between the support beam and doubler plate. The effect was to stiffen the shell wall/ support beam junction and extend the stiffener to a position were the magnitude of stress was not high.

Example 1 describes an analysis to test whether the switch condenser junctions were sensitive to fatigue. The analysis suggested that the combination of component geometry and assumed temperature profile over the condenser height leads to a finite fatigue life of the support beam/shell junctions. This result was consistent with operating experience. Example 2 verified the assumptions made with respect to the temperature profile over the height of the condenser. Direct measurement of strain, using strain gauges, confirmed that stress ranges were sufficiently high from the cyclic temperature to limit junction life. Example 3 defined the expected benefits that may be achieved to the upper and lower junctions by the addition of stiffeners as designed according to FIGS. 6-9. The model used in Example 1, and verified by strain measurements in Example 2, has been used to evaluate the potential benefit of modifications to upper and lower junctions. It was predicted that fatigue life may be extended by approximately a factor up to 50 or better.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc., are herein fully incorporated by reference for all jurisdictions in which such incorporation is permitted and to the extent such disclosure is consistent with the description of the present invention.

What is claimed is:

1. A switch condenser adapted to operate in cyclic service and having a temperature gradient of from 50° C. to 200° C., the switch condenser comprising:

(a) a shell defining an internal space, the shell having a first inner surface and a first outer surface on a first side of the shell and a second inner surface and second outer surface on a second side of the shell;
   (b) a plurality of at least two support members extending beyond a width of the shell and crossing through the first inner surface, the first outer surface, the second inner surface, and the second outer surface along a horizontal axis of the shell;
   (c) a plurality of side supports located outside of the shell proximal to the first and second outer surfaces the plurality of side supports coupled to the plurality of support members; and
   (d) at least one stiffener located in the internal space of the shell the at least one stiffener coupling the first inner surface or the second inner surface to one or more of the plurality of support members, wherein the at least one stiffener comprises an internal rib coupled with a doubler plate.

2. The switch condenser of claim 1, wherein the switch condenser further comprises at least one of (e) a base and (f) a plurality of tubular bundles.

3. The switch condenser of claim 1, wherein the plurality of support members includes lower support members, middle support members, and upper support members.

4. The switch condenser of claim 1, wherein the plurality of support members includes outer support members and inner support members.

5. The switch condenser of claim 1, wherein the plurality of support members are placed equidistant with relation to each other along a vertical axis of the switch condenser.

6. The switch condenser of claim 1, wherein the plurality of support members are placed equidistant with relation to each other along the horizontal axis of the switch condenser.

7. The switch condenser of claim 1, wherein the at least one stiffener further comprises an internal rib support member coupled to the internal rib and the support member.

8. The switch condenser of claim 1, wherein the at least one stiffener comprises at least one insert plate, wherein insufficient space is available for a stiffener based on an internal rib and a doubler plate.

9. The switch condenser of claim 1, wherein any junctions formed between the plurality of support members, the at least one stiffener, the inner surfaces, and the outer surfaces are made permanent, by welding.

10. The switch condenser of claim 2, wherein any one or all of (a)-(f) comprises a Group 3-13 metal, carbon, or any combination thereof.

11. The switch condenser of claim 2, wherein any one or all of (a)-(f) comprises iron, carbon, aluminum, titanium, and any combination thereof.

12. The switch condenser of claim 2, wherein any one or all of (a)-(f) comprises at least one coating.

* * * * *